United States Patent
Hasushita

[11] Patent Number: 6,141,504
[45] Date of Patent: Oct. 31, 2000

[54] FINDER OPTICAL SYSTEM

[75] Inventor: Sachio Hasushita, Saitama, Japan

[73] Assignee: Asahi Kogaku Kogyo Kabushiki Kaisha, Tokyo, Japan

[21] Appl. No.: 09/374,105

[22] Filed: Aug. 16, 1999

[30] Foreign Application Priority Data

Aug. 25, 1998 [JP] Japan .................................. 10-239018

[51] Int. Cl.[7] .................................................. G03B 13/10
[52] U.S. Cl. ............................................................ 396/380
[58] Field of Search ..................................... 396/373–386

[56] References Cited

U.S. PATENT DOCUMENTS

| | | | |
|---|---|---|---|
| 4,389,097 | 6/1983 | Ohishi | 396/379 |
| 5,136,427 | 8/1992 | Sugawara | 359/646 |
| 5,790,908 | 8/1998 | Matsuda | 7/165 |
| 6,006,038 | 12/1999 | Kosako | 396/373 X |

FOREIGN PATENT DOCUMENTS 9146019  6/1997  Japan .

Primary Examiner—W. B. Perkey
Attorney, Agent, or Firm—Greenblum & Bernstein, P.L.C.

[57] ABSTRACT

In a SLR camera having a diopter adjusting lens element movable along the optical axis, the movement of which causes a change in the apparent visual angle, there is provided a finder optical system including a field frame size varying mechanism for varying the size of the opening of the field frame, and an association mechanism for driving the field frame size varying mechanism so that the change in the apparent visual angle of the finder optical system is compensated when the diopter is varied by moving the diopter adjusting lens element.

4 Claims, 6 Drawing Sheets

0 dptr

-1 dptr

-2 dptr

FINDER OPTICAL SYSTEM

BACKGROUND OF THE INVENTION

1. Field of the Invention

The present invention relates to a finder optical system of a single lens reflex camera.

2. Description of the Related Art

A finder optical system of a single lens reflex camera (hereinafter, a SLR camera), in which the diopter suitable for an operator can be adjusted by moving a diopter adjusting lens element being a part of an eyepiece optical system along the optical axis, is known in the art. For example, in U.S. Pat. No. 4,389,097, a SLR camera which employs a penta prism as an erecting optical system is provided with a finder optical system including a negative lens element, a positive lens element, a positive lens element and a negative lens element, the two positive lens elements of which are moved to vary a focal length of the eyepiece optical system whereby the diopter is adjusted.

Furthermore, in a SLR camera, in order to comply with cost and weight reduction requirements, a 'penta-mirror,' i.e., an assembly of plurality of mirrors, through which light ray is reflected in the same way as a penta prism to erect an image is known in the art. For example, U.S. Pat. No. 5,136,427 and Japanese Unexamined Patent Publication No.9-146019 disclose an eyepiece optical system of a SLR camera having this type of penta-mirror.

When a penta-mirror is used in an erecting optical system, the equivalent air optical path becomes approximately 1.5 times (multiplication of a refractive index of the penta prism to be compared) longer than that of a penta prism under the same conditions wherein the penta-mirror and the penta prism have the same geometric distances of the reflection optical paths thereof. Consequently, the focal length of a finder optical system becomes long, which causes a magnification reduction of the finder optical system. In order to solve this problem, in U.S. Pat. No. 5,136,427, a lens element having a strongly powered concave surface is provided on the side of an operator's eye whereby (i) the principal points are positioned as close to the penta-mirror as possible, (ii) the focal length of the eyepiece optical system is made short, and (iii) magnification reduction of the finder optical system is prevented.

Also, in Japanese Unexamined Patent Publication No. 9-146019, a negative lens element having a strongly powered concave surface is provided on the side of the operator's eye, and a strongly powered positive lens element is provided on the penta-mirror side whereby (i) the principal points are positioned as close to the penta-mirror as possible, (ii) the focal length of the eyepiece optical system is made short, and (iii) a magnification reduction of the finder optical system is prevented. Furthermore, by varying the distance between the negative and positive lens elements, the diopter with respect to the focusing screen on which the photographing optical system of a SLR camera forms a real image can suitably be adjusted for an individual operator.

However, in Japanese Unexamined Patent Publication No. 9-146019, upon adjusting the diopter, since the strongly powered positive and negative lens elements are relatively moved, the apparent visual angle is largely varied as well. The adjusting of the diopter is usually performed while an operator is looking through the finder, and accordingly, unpleasant for the operator to observe the apparent visual angle being varied. In particular, when the diopter is being suitably set for the operator, if the apparent visual angle is narrowed, the feel of unpleasantness may be intensified.

SUMMARY OF THE INVENTION

It is an object of the present invention to provide a finder optical system, in a SLR camera having a function to adjust the diopter by moving a diopter adjusting lens element along the optical axis, that can compensate the change in the apparent visual angle of the finder optical system, even when the diopter (focal length) is adjusted.

In order to achieve the above-mentioned object, in a SLR camera having a diopter adjusting lens element movable along the optical axis, the movement of which causes a change in the apparent visual angle, there is provided a finder optical system including a field frame size varying mechanism for varying the size of the opening of the field frame, and an association mechanism for driving the field frame size varying mechanism so that the change in the apparent visual angle of the finder optical system is compensated when the diopter is varied by moving the diopter adjusting lens element.

The present invention can be applied to a SLR camera having a penta prism; however, it is more effective to apply the present invention to a SLR camera having a penta-mirror in which the equivalent air optical path is long.

More than one lens element constituting the eyepiece optical system can function as the diopter adjusting lens element.

The present disclosure relates to subject matter contained in Japanese Patent Application No. 10-239018 (filed on Aug. 25, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 6:
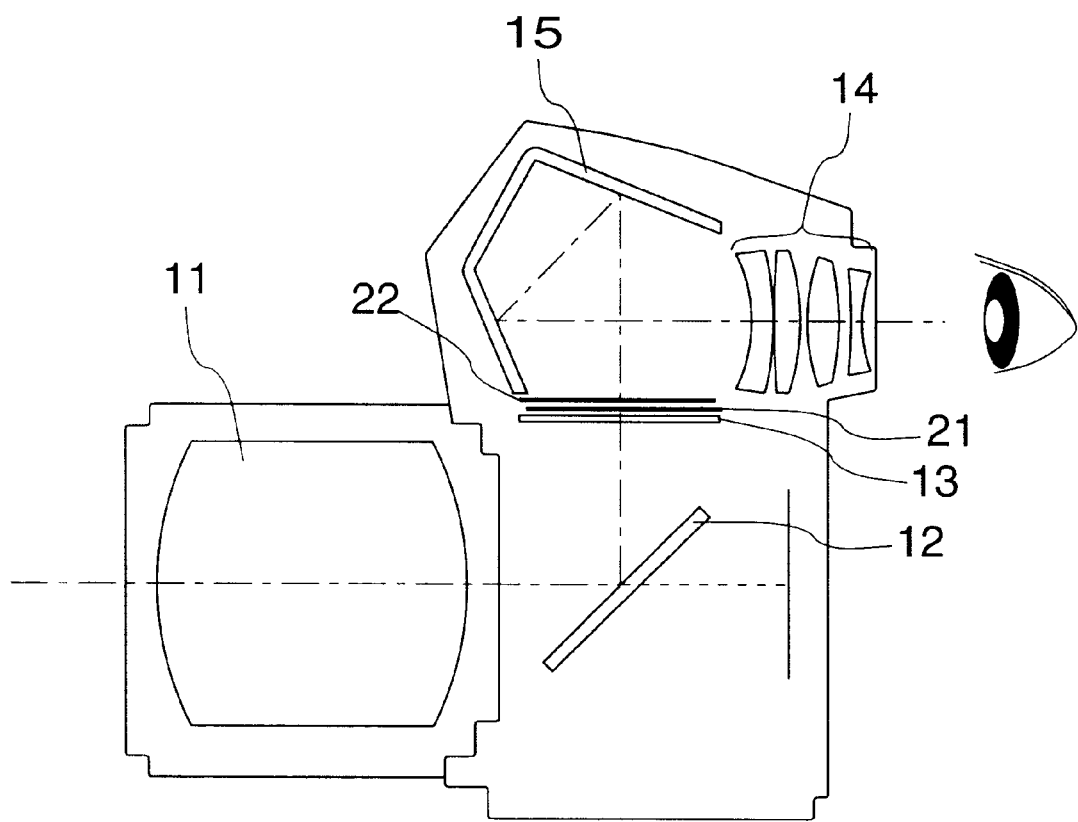
FIG. 6 is a schematic drawing showing a SLR camera to which the present invention is applied.

As shown in FIG. 6, in a single lens reflex camera (SLR camera), an object image incident on a photographing optical system 11 is reflected on a quick-return mirror 12, and is formed as a real image on a focusing screen 13. An operator observes an enlarged real image through a field frame formed by a pair of field frame plates 21 and 22, a penta prism or penta-mirror 15 and an eyepiece optical system 14. The quick-return mirror 12 and the penta prism or penta-mirror 15 is an erecting optical system to erect an inverted image which is upside down and reversed from left to right to the same orientation as the object. As explained above, it is more effective to apply the present invention to an erecting optical system including a penta-mirror having the long equivalent air optical path.

Figure 4:
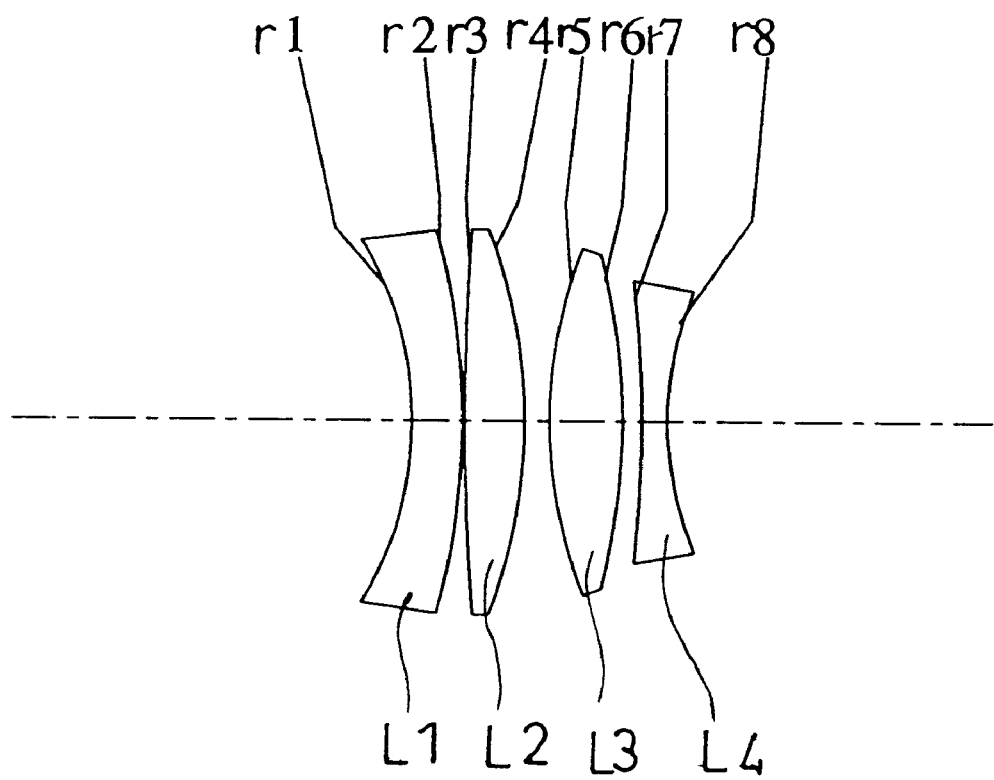
FIG. 4 is a lens arrangement of the eyepiece optical system.

FIG. 4 shows a lens arrangement of the eyepiece optical system 14, and Table 1 indicates specific numerical data thereof. The eyepiece optical system 14 includes a negative first lens element L1, a positive second lens element L2, a positive third lens element L3 and a negative fourth lens element L4 in this order from the focusing screen 13. The positive third lens element L3 is a diopter adjusting lens element. In Table 1, DP designates the diopter, fe designates the focal length of the eyepiece optical system 14, R designates the radius of curvature of each lens surface, D designates the lens thickness or distance, Nd designates refractive index with respect to the d-line, νd designates the Abbe number.

In addition to the above, an aspherical surface which is symmetrical with respect to the optical axis is defined as follows:

$$x = Ch^2 / \{1 + [1 - (1+K)C^2h^2]^{1/2}\} + A4h^4 + A6h^6 + \ldots ;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

TABLE 1

DP=0~−1~−2 [dptr]
fe=74.90~82.00~90.11

| Surface No. | R | D | Nd | νd |
|---|---|---|---|---|
| 1* | −17.663 | 2.400 | 1.58547 | 29.9 |
| 2 | −33.693 | 0.100 | — | — |
| 3 | 120.946 | 2.838 | 1.58547 | 29.9 |
| 4 | −25.353 | 0.770–1.197–1.601 | — | — |
| 5 | 22.019 | 3.489 | 1.49176 | 57.4 |
| 6* | −27.010 | 1.331–0.906–0.500 | — | — |
| 7 | −56.198 | 1.200 | 1.58547 | 29.9 |
| 8* | 15.000 | — | — | — |

*designates the aspherical surface which is symmetrical with respect to the optical axis.

Aspherical surface data (the aspherical surface coefficients not indicated are zero (0.00)):

| Surface No. | K | A4 | A6 |
|---|---|---|---|
| 1 | 0.00 | $-0.3473 \times 10^{-4}$ | $0.7122 \times 10^{-7}$ |
| 6 | 0.00 | $0.5179 \times 10^{-4}$ | $-0.1283 \times 10^{-6}$ |
| 8 | 0.00 | $-0.7236 \times 10^{-4}$ | $0.1616 \times 10^{-6}$ |

In the eyepiece optical system 14, the diopter with respect to the focusing screen 13 is adjusted by moving the positive third lens element L3, i.e., the diopter adjusting lens element, forward or backward along the optical axis. More specifically, when the positive third lens element L3 is moved towards the positive second lens element L2, the diopter is varied in the positive direction. On the other hand, when the positive third lens element L3 is moved towards the negative fourth lens element L4, the diopter is varied in the negative direction. However, in these adjusting operations, the apparent visual angle is inevitably varied by a large degree.

Table 2 indicates the change of the apparent visual angle when the diopter is 0 (zero), −1 and −2 under the condition that a picture format and a finder coverage are supposed to be 24 mm×36 mm and 92%, respectively.

TABLE 2

| Diopter (dptr) | Finder Coverage (%) | Field Frame (mm) | Apparent Visual Angle (degree) |
|---|---|---|---|
| 0 | 92.0 | Vertical 22.08 | 16.8 |
|  | 92.0 | Horizontal 33.12 | 25.0 |
| −1 | 92.0 | Vertical 22.08 | 16.2 |
|  | 92.0 | Horizontal 33.12 | 24.1 |
| −2 | 92.0 | Vertical 22.08 | 15.7 |
|  | 92.0 | Horizontal 33.12 | 23.3 |

As indicated, provided that the size of the field frame is constant (constant finder coverage), according to the change of the diopter, the apparent visual angle with respect to the vertical direction is varied by 1.1 degrees, and the apparent visual angle with respect to the horizontal direction is varied by 1.7 degrees.

Figure 1:
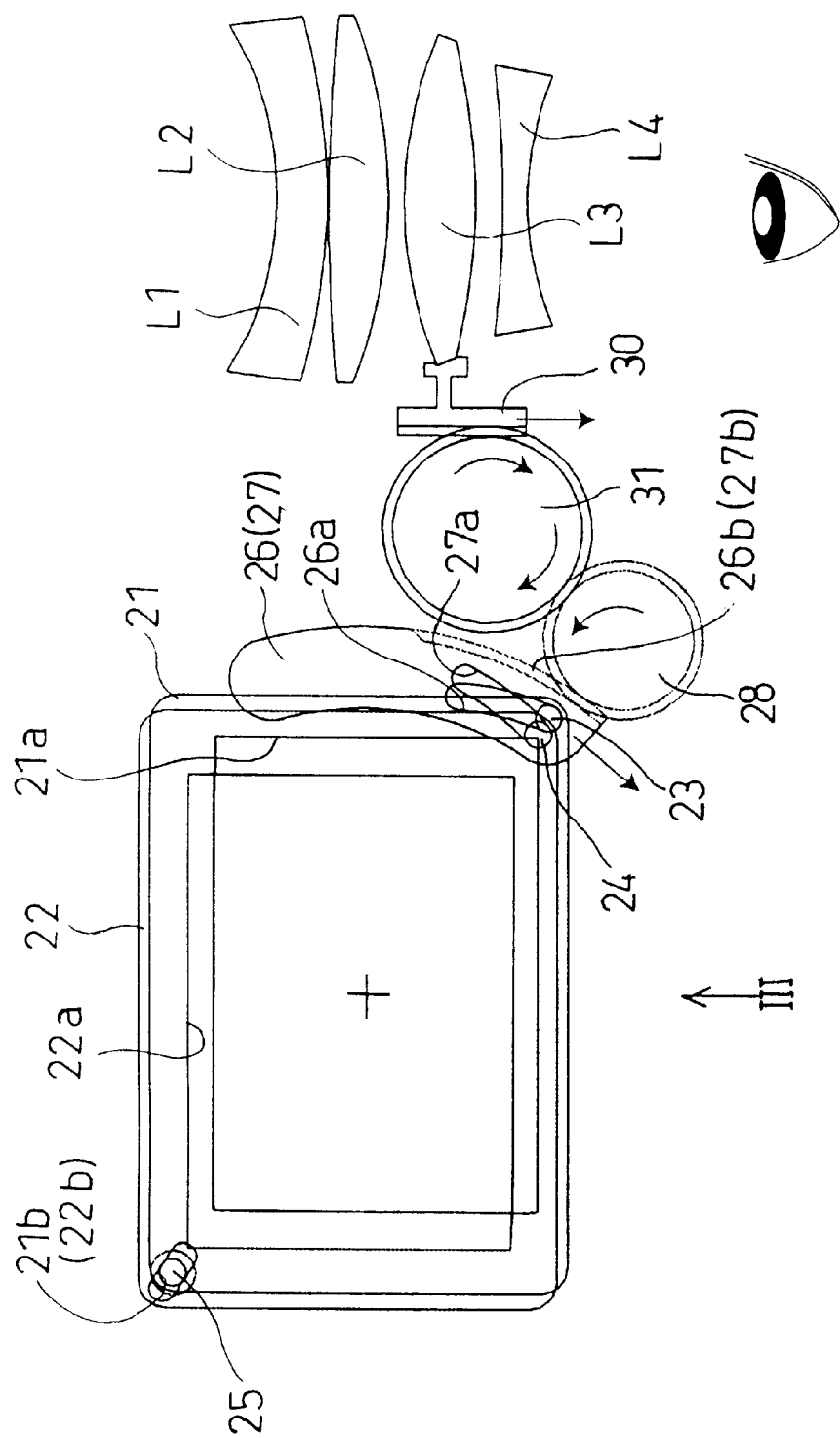
FIG. 1 is an explanatory view showing the association among the field frame, the eyepiece optical system, and the gear mechanism provided therebetween, wherein the eyepiece optical system and the gear mechanism are displayed as being at the side of the field frame for illustration purposes; and further shows an embodiment of a finder optical system with a diopter of 0 (zero), according to the present invention.
Figure 2:
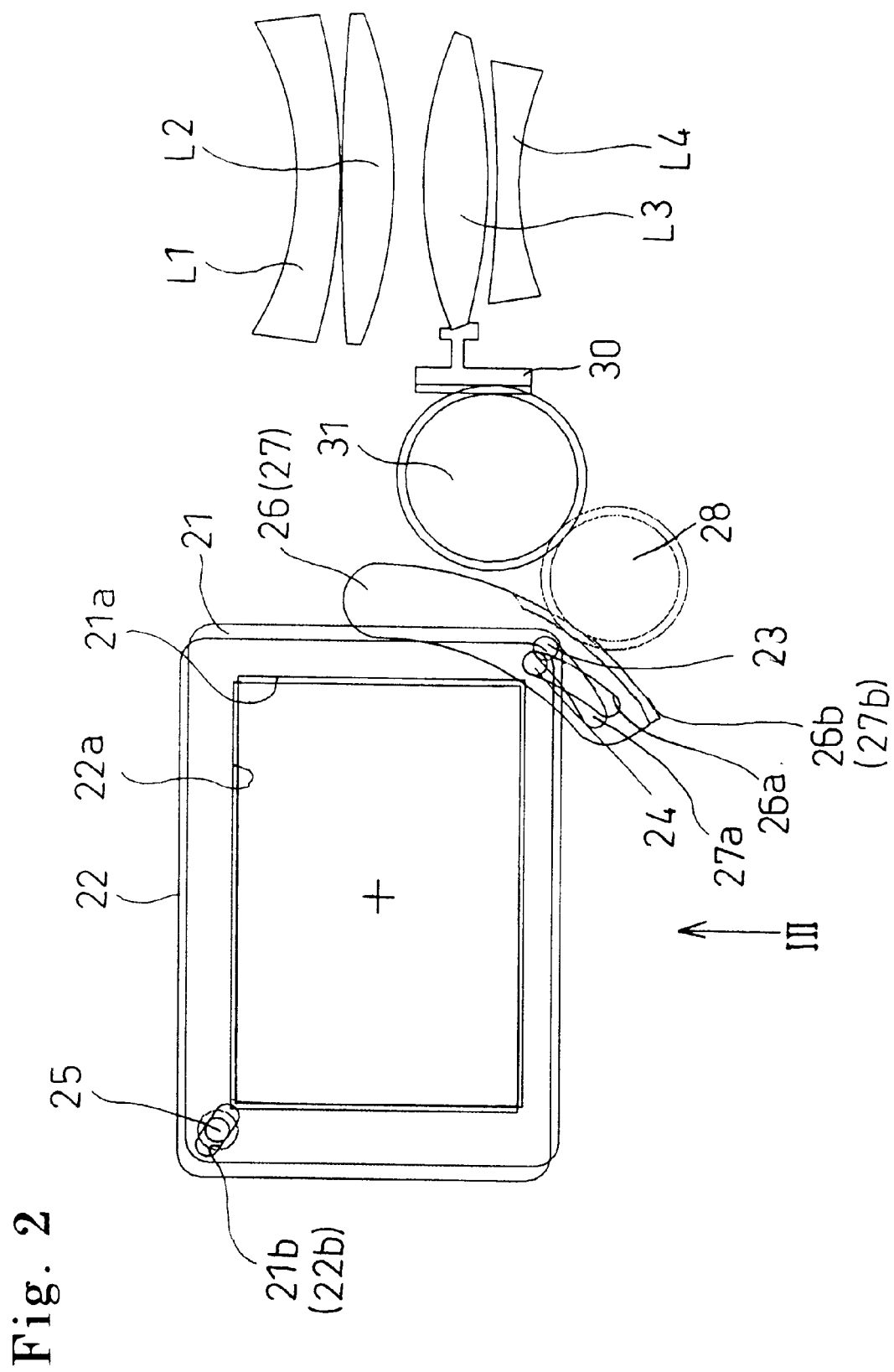
FIG. 2 is an explanatory view showing the association among the field frame, the eyepiece optical system, and the gear mechanism provided therebetween, wherein the eyepiece optical system and the gear mechanism are displayed as being at the side of the field frame for illustration purposes; and further shows an embodiment of a finder optical system with a diopter of −2, according to the present invention.
Figure 3:
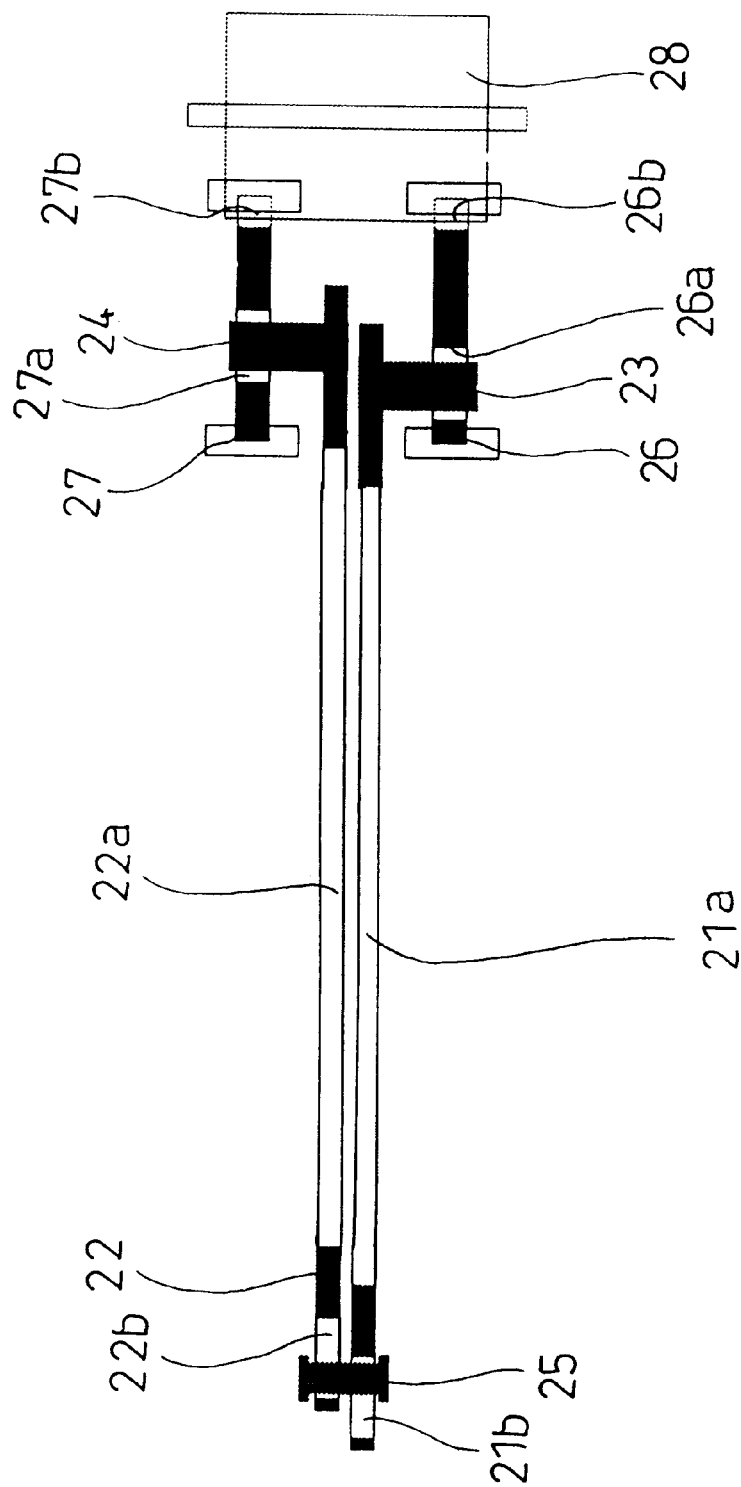
FIG. 3 is a side view of the finder optical system viewed from the arrow III in FIGS. 1 and 2.

According to the present invention, the size of the opening of the field frame positioned in the vicinity of the focusing screen is varied in accordance with the diopter adjusting operation through the eyepiece optical system so that the change in the apparent visual angle of the finder optical system is compensated when the diopter is varied by moving the diopter adjusting lens element. In other words, the apparent visual angle is kept constant with respect to different values of the diopter. FIGS. 1 through 3 show an embodiment of a field frame size varying mechanism for varying the size of the opening of the field frame, and an association mechanism for inter-connecting the field frame size varying mechanism with the movement of the diopter adjusting lens element.

In the vicinity of the focusing screen 13, the pair of field frame plates 21 and 22 are superimposed. Both field frame plates 21 and 22 have the openings 21a and 22a at the center thereof corresponding to the picture format. The size of the opening of the field frame is varied in accordance with the degree of overlapping of the field frame plates 21 and 22.

Guide grooves 21b and 22b are provided at one corner of the diagonally opposed corners of the field frame plates 21 and 22, and driving pins 23 and 24 are provided at the other corner thereof. A common guide pin 25 which is provided on a stationary portion of the camera body is inserted into the guide grooves 21b and 22b. At the other corner thereof, two identically shaped cam plates 26 and 27 on which cam grooves 26a and 27a having different arcuate loci are provided, respectively. Furthermore, the cam plates 26 and 27 have sector gears 26b and 27b, both of which engage with a common gear 28.

Furthermore, the positive third lens element L3, i.e., the diopter adjusting lens element, of the eyepiece optical system 14 is linearly guided along the optical axis, and has a rack 30 which is parallel with the optical axis and is integrally formed with the diopter adjusting lens element L3. An adjusting gear 31 engages with the rack 30, and rotates in association with the movement of the rack 30. The adjusting gear 31 engages with the common gear 28 whereby when the adjusting gear 31 is rotated, the cam plates 26 and 27 are moved to perform circular motion because of the arcuate peripheries thereof on which the sector gears 26b and 27b are formed to engage with the common gear 28. In response to the circular motion of the cam plates 26 and 27, the field frame plates 21 and 22 are moved, following the cam grooves 26a and 27a, so that the opening of the field frame is varied. The above explained association of the gears is an example. Therefore the present invention is not limited thereto.

Figure 5:
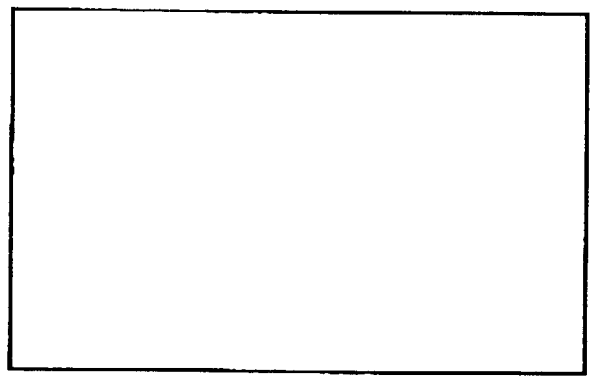
FIG. 5 is a plan view showing the size of the opening of the field frame along with the change of the diopter.
Figure 5:
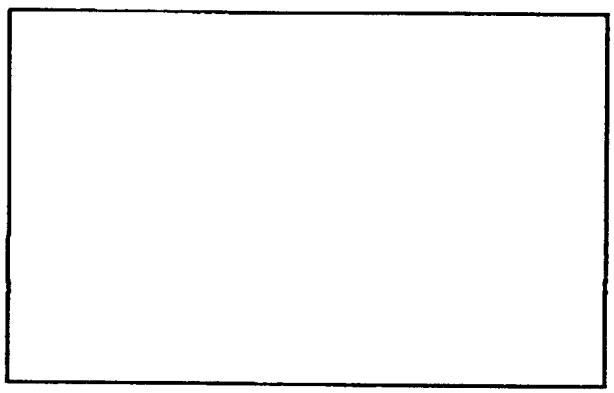
Figure 5:
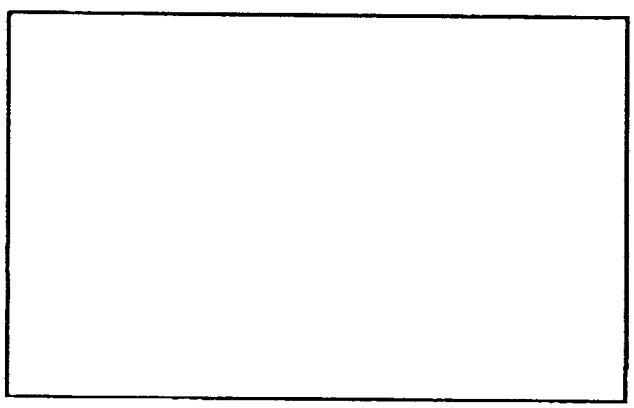

The eyepiece optical system 14 (shown in FIG. 1) is set to 0 (zero) diopter in which the opening of the field frame formed by overlapping of the openings 21a and 22a of the field frame plates 21 and 22 is at the minimum size thereof. From the position shown in FIG. 1, the diopter varies in the negative direction when the diopter adjusting lens element L3 is moved towards the operator's eye, whereby the opening of the field frame formed by the respective openings 21a and 22a is gradually enlarged. The eyepiece optical system 14 shown in FIG. 2 shows the position at a diopter of −2 in which the opening of the field frame is at the maximum size thereof. The adjustment of the diopter (focal-length-change) and the change of the field frame opening size are inter-connected so that the apparent visual angle does not change while the diopter is adjusted. FIG. 5 shows the change of the opening of the field frame when the diopter is 0 (zero), −2 and −1 respectively. The field frame opening is gradually enlarged from 0 (zero) diopter to −2 diopter.

The change of the field frame opening is equivalent to the change the finder coverage. However, the finder coverage of a SLR camera originally has a range of approximately 90 through 100%. Further, users of SLR cameras empirically tend not to notice the change of the finder coverage as much as the change of the apparent visual angle. According to the present invention, the finder coverage that is varied in accordance with the diopter adjusting operation is made to vary within the range of the finder coverage which is generally provided in a SLR camera, so that the finder optical system in which the apparent visual angle remains constant upon the diopter adjusting operation can be obtained.

Table 3 indicates the apparent visual angle and the change of the field frame along with the change of the diopter, which are obtained through the operations of the eyepiece optical system 14 shown in FIG. 4 and Table 1, the field frame size varying mechanism, and the association mechanism shown in FIGS. 1 through 3.

TABLE 3

| Diopter (dptr) | Finder Coverage (%) | Field Frame (mm) | Apparent Visual Angle (degree) |
|---|---|---|---|
| 0 | 90.0 | Vertical 21.60 | 16.4 |
|   | 90.0 | Horizontal 32.40 | 24.5 |
| −1 | 93.3 | Vertical 22.39 | 16.4 |
|   | 93.4 | Horizontal 33.63 | 24.5 |
| −2 | 96.5 | Vertical 23.15 | 16.4 |
|   | 96.7 | Horizontal 34.82 | 24.5 |

As shown in Table 3, the size of the field frame is varied in accordance with the adjustment of the diopter: when the diopter is 0 (zero), the field frame is 21.60 mm (vertical)× 32.40 mm (horizontal) (finder coverage 90%×90%); when the diopter is −2, the field frame is 23.15 mm (vertical)× 34.82 mm (horizontal) (finder coverage 96.5%×96.7%). Further, according to Table 3, the apparent visual angle is constantly at 16.4 (deg)×24.5 (deg). The finder coverage is varied; however, the range of the change is within a standard finder coverage of a SLR camera.

According to the present invention, a finder optical system of a SLR camera in which the apparent visual angle is maintained constant even when the diopter is adjusted is obtained.

What is claimed is:

1. A finder optical system of a single lens reflex camera comprising a diopter adjusting lens element movable along the optical axis, the movement of which causes a change in the apparent visual angle; said finder optical system comprising:

a field frame size varying mechanism for varying the size of an opening of said field frame, and an association mechanism for driving said field frame size varying mechanism so that said change in the apparent visual angle of said finder optical system is compensated when the diopter is varied by moving said diopter adjusting lens element.

2. The finder optical system according to claim 1, wherein an erecting optical system of said single lens reflex camera comprises a penta-mirror.

3. The finder optical system according to claim 1, wherein said diopter adjusting lens element comprises at least one lens element constituting an eyepiece optical system.

4. The finder optical system according to claim 2, wherein said diopter adjusting lens element comprises at least one lens element constituting an eyepiece optical system.

* * * * *